United States Patent [19]

Findley

[11] Patent Number: 4,803,085

[45] Date of Patent: Feb. 7, 1989

[54] PRESERVATIVE COATING FOR HARD SOLID ANIMAL FEED SUPPLEMENT

[75] Inventor: John E. Findley, Claremont, Calif.

[73] Assignee: Pacific Kenyon Corp., Long Beach, Calif.

[21] Appl. No.: 47,504

[22] Filed: May 1, 1987

Related U.S. Application Data

[63] Continuation of Ser. No. 771,603, Sep. 3, 1985, abandoned.

[51] Int. Cl.$^4$ ................................. A23K 1/22
[52] U.S. Cl. ........................... 426/69; 426/74; 426/293; 426/302; 426/310; 426/656; 426/658; 426/807
[58] Field of Search ................ 426/293, 310, 302–303, 426/623, 635, 658, 807, 69, 74, 656

[56] References Cited

U.S. PATENT DOCUMENTS

| | | | |
|---|---|---|---|
| 1,911,020 | 5/1933 | Grant | 426/399 |
| 2,975,067 | 3/1961 | Winterberg | 426/293 |
| 3,066,033 | 11/1962 | Clark | 426/310 |
| 3,275,454 | 9/1966 | Winterberg | 426/310 |
| 3,420,672 | 1/1969 | Appleman | 426/635 |
| 3,556,814 | 1/1971 | Whitman et al. | 426/310 |
| 3,798,338 | 3/1974 | Galle | 426/310 |
| 4,075,325 | 2/1978 | Kauzal | 424/140 |
| 4,082,854 | 4/1978 | Yamada et al. | 426/127 |
| 4,221,818 | 9/1980 | Schroeder | 426/658 |
| 4,247,561 | 1/1981 | Nelson | 426/310 |

OTHER PUBLICATIONS

Hawley, "The Condensed Chemical Dictionary", Eighth Edition Van Nostrand Publishers (1971) p. 714.

*Primary Examiner*—R. B. Penland
*Attorney, Agent, or Firm*—Plante Strauss & Vanderburgh

[57] ABSTRACT

The invention is a preservative coating for solid animal feed supplement and a method for its application. The solid feed supplement is produced as a viscous liquid that gels into a hard solid after it has been poured into molds which are usually the cartons for the final supplement packages. The preservative coating is a digestible film former which, optionally, contains an effective amount of mold inhibitor.

8 Claims, No Drawings

PRESERVATIVE COATING FOR HARD SOLID ANIMAL FEED SUPPLEMENT

BACKGROUND OF THE INVENTION

1. Field of Invention

This invention relates to an animal feed supplement and, in particular, to a preservative coating for a solid animal feed supplement.

2. Brief Statement of the Prior Art

Molasses has been used for many years an an animal feed supplement together with additives such as phosphoric acid and feed nutrients such as urea, fats, and the like. Solid materials such as cottonseed meal have also been suspended in the molasses; however, difficulties have been experienced with maintaining a stable suspension of solid materials. The liquid materials have been fed by application to fodder or by free choice feeding on lick-wheels.

Feed supplements have also been manufactured and marketed as solid blocks. The earliest blocks were pressed blocks which were formed by compressing mixtures of molasses and dry feed ingredients. Poured blocks in which the ingredients are mixed with molasses and poured into cardboard cartons where they solidify are more recent developments. The earliest commercial poured block was prepared by evaporative heating of the molasses similar to candy manufacturing as described in U.S. Pat. No. 3,961,081. This block lacked water resistance, and the evaporated molasses block also melted at elevated storage temperatures.

The most recent advances in supplement have been the poured chemical blocks, in which additives are used to gel molasses and form water-resistance solids. Large amounts of calcium oxide or magnesium oxide have been added to molasses and the mixtures have been heated to form solid supplements in the manner described in New Zealand Patent Specification No. 170,505.

Entirely chemically gelled and hardened poured blocks and their manufacture are described in U.S. Pat. No. 4,027,043, 4,160,041 and 4,431,675. These blocks are prepared by the reaction of molasses, a soluble phosphate and the oxide or soluble salt of calcium and/or magnesium. No heating is required and the liquid mixture is poured into cardboard cartons for solidification. Maximum hardness is attained by using both calcium and magnesium oxides.

Another method of manufacture of a poured block is described in U.S. Pat. No. 4,171,385 and 4,171,386 in which the molasses is gelled with clay which is added with high shear agitation. Magnesium oxide is added to the liquid mixture and the hardness of the block can be increased by the addition of ferrous sulfate, as described in U.S. Pat. No. 4,265,916.

These products are intended for free choice or managed feeding. Unfortunately, all the aforementioned supplement blocks are affected to some degree by the environment. Usually the blocks lose from 1 to about 5 weight percent moisture in the few days immediately following their manufacture. In hot, dry climates, further loss of water occurs to the extent that the blocks shrink and crack, resulting in an unattractive appearance. When exposed to elevated storage temperatures and high humidity, mold can also develop on the surface of the blocks.

BRIEF STATEMENT OF THE INVENTION

This invention comprises a preservative coating for a solid animal feed supplement which, preferably, is applied as a liquid to the surface of the liquid block ingredients after they have been poured into their packaging cartons. Surprisingly, it has been found that the liquid preservative coating can be applied directly onto the liquid surface before it solidifies into blocks and the coating will congeal into a water resistant coating on the block product. The solification of commercial feed solutions of sugars or proteins or mixtures thereof for the block can be achieved by any of the various techniques, usually involving addition of one or both of magnesium oxides or hydroxides and a soluble sulfate or phosphate, preferably phosphoric or sulfuric acid.

Alternatively, the aqueous film former can be preformed as a thin film having a thickness from 0.5 to about 10 mils, preferably from 1 to about 5 mils and wrapped about the blocks using conventional wrapping methods, e.g., shrink wrapping.

The animal feed solution to which the solidifying ingredients are added comprises an aqueous solution of sugar or protein or mixtures thereof, preferably molasses.

THE FEED SUPPLEMENT

The feed supplements which are used for practice of this invention in general have the composition set forth in the following table:

TABLE 1

| Ingredient | Proportions, Weight Percent | |
|---|---|---|
| | Broad | Preferred |
| Feed solution | 45–95 | 55–80 |
| Sulfate or Phosphate* | 1–8 | 3–5 |
| Calcium** | 1–8 | 2–5 |
| Magnesium** | 3–10 | 4–7 |
| Total Water | 10–35 | 15–28 |
| Protein or Non-protein nitrogen*** | 0–40 | 5–20 |
| Fat | 0–30 | 0–20 |
| Vitamins | 0–3 | 0.1–2 |
| Minerals | 0–40 | 0.1–2 |

*Expressed as $SO_4$ or $P_2O_5$
**Expressed as oxides.
***Expressed as weight percent of equivalent protein.

The content of minerals, phosphorous and calcium, as well as other ingredients such as drugs, vitamins, etc., can be varied as desired for specific applications. Examples of various minerals are manganese, iodine, zinc, copper, cobalt and iron compounds. In some specific applications, a high content mineral supplement is desirable, e.g., containing from 6 to 10 percent phosphorous, 5 to 8 percent calcium and from 0.1 to 2 percent of mineral salts, added as finely divided powders. These salts can be water insoluble salts such as dicalcium and tricalcium phosphate or can be water soluble salts such as monoammonium phosphate. Examples of vitamins include Vitamin A, Vitamin D, and Vitamin E.

Examples of useful drugs are: growth promoting food additives or drugs such as monensin and sodium monensin, commercially available under the designation Rumensin from Eli Lilly Co.; chlorotetrcycline and sulfamethiazine; and mixtures of chlorotretacyline and sulfamethiazine; etc. Other useful drugs include antibloat and antihelmintic agents as well as insect control agents. The aforementioned materials are used in effective concentrations for the desired result, e.g., drugs are used at concentrations from 0.5 to about 1.0 weight percent. The minerals are usually used in similar concentrations, but are often expressed in amounts from 3 to about 500 milligrams per pound and vitamins are frequently expressed from 10 to about 50,000 units per pound.

THE PRESERVATIVE COATING

The preservative is a liquid film former and can be an aqueous base liquid, e.g., an emulsion or solution of film formers such as polyvinyl alcohol, polyvinyl acetate, ethylene-vinyl acetate copolymers, and alkyl cellulose esters in a liquid medium such as water or an ancohol, e.g., methanol, ethanol, normal and isopropanol, etc. The film former can also be an oligeneous base liquid such as petroleum wax or vegetable wax, polysilicons, etc. Waxes which are particularly useful have melting points from 100° F. to about 150° F., preferably from about 115° to 125° F. Waxes are preferably selected which have a melting point at or close to the maximum temperature reached by the supplement after it is poured into containers. With most supplement formulations, this temperature range is from 110° to 135° F. Mineral oils can be included in the oligeneous base film formers as extenders or modifiers to enhance their filming properties, and to control their melting point. The waxes can be used without dilution, or can be dissolved or suspended in an alcohol such as previously mentioned, at concentrations from 10 to 75 weight percent, preferably from 25 to 65 weight percent to provide a liquid which can be sprayed or brushed onto the supplement without heating.

Preferably, a microcide and/or insecticide ingredient is included in the liquid film former. This can be an ingredient having a specific activity for the particular microorganism which is to be controlled, including bacteriocides and fungicides. The microcide is included at an effective concentration which is preselected for each specific microcide and is generally from about 0.0001 to about 2 weight percent. Examples of suitable microcides include the following:

Fungicides: organic acids such as the $C_2$ to about $C_8$ alkanoic, alkenoic, and alkdienoic mono and dicarboxylic acids including acetic, propionic, butyric, valeric, isobutyric, 2-ethylbutyric, oxalic, malonic, succinic, glutaric, adipic, pimelic, maleic and sorbic acids, etc.; aromatic and wood acids such as benzoic, ethylbenzoic; pyroligneous acids, etc.; iodine; mercuric chloride; alkali metal bisulfides, e.g., sodium bisulfide; phenol; hexachloroprene; formaldehyde; gentian violet; antibiotic compounds such as Delvocid, a fungicidal tetraene having the emperical formula $C_{33}H_{47}NO_{13}$ etc.

Bactericides such as sodium bisulfite, iodine, mercuric chloride, phenol, hexachloroprene, formaldehyde, quaternary ammonium compounds, peroxides, etc.

Insecticides which can be used include those which are useful in animal feeds, i.e., those which are not toxic to the animal and which will not result in any harmful or objectionable residue in the raw agricultural commodity obtained from the animals. Examples of such insecticides are: sulfur, lime/sulfur, Methosychlor, Ronnel, phenothiazine, Rabon, etc.

Additionally, a flavoring additive can also be included in the coating to improve the appearance and palability of the solid supplement. Examples of suitable flavoring additives are: anise, apple flavoring, caramel flavor, molasses flavoring, etc.

The coating is applied to the block in sufficient quantity to form a coherent film on the surface of the block. When it is applied as a liquid, a sufficient quantity is applied to prepare a film having a thickness from about 0.1 to about 10 mils, preferably from about 0.5 to about 5 mils. This will be from 0.05 to about 5 grams, preferably from 0.1 to about 20, most preferably from 0.5 to 5 grams, per square foot of the area to be covered.

When the base coating is used in a liquid such as water or an alcohol, the film former compound such as polyvinyl alcohol is preferably dissolved in the liquid, e.g., water at a concentration of from 5 to 25, preferably from 7 to about 15, weight percent. The same concentrations can be used in an alcohol. Sufficient amounts of the resultant solution are applied to achieve the aforementioned quantities of the film coating on the surface area of the block.

THE FEED SOLUTION

The animal feed supplement is prepared from a commercial aqueous feed solution. Generally, this will be a sugar solution, and a variety of sugar solutions can be used; however, molasses is a preferred source. The feed solution should be present in the feed supplement at a concentration of from 45 to about 95, preferably from 55 to about 80, weight percent. The preferred molasses source is commercially available with a sugar content from about 65 to 85 Brix and a consistency that varies from a thin to a thick syrup. The water content of these solutions is from 5 to about 30 weight percent. The molasses can be any sugar containing molasses such as cane or Blackstrap Molasses, beet molasses, converted molasses wood sugar molasses, hydrosyrup, citrus molasses and the like.

Another sugar solution that can be used is whey, a byproduct of the dairy industry. The whey is a dilute solution of lactoalbumin, lactose, some fats, and the soluble inorganics from the parent milk. This whey solution is condensed and spray dried to a powder or is condensed to about 40 to 60 percent solids and preserved. A typical analysis is as follows:

TABLE 2

| Composition of a Typical Dried Whey | |
|---|---|
| Protein | 12.0% |
| Fat | 0.7% |
| Lactose | 60.0% |
| Phosphorous | 0.79% |
| Calcium | 0.87% |
| Ash | 9.7% |

A third source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:

Ammonium lignin sulfonate;
Sodium lignin sulfonate; and
Magnesium lignin sulfonate.

A typical analysis of a commercially available ammonium lignin sulfonate solution is as follows:

TABLE 3

| Typical Analysis of Ammonium Lignin Sulfonate | |
|---|---|
| Percent Solids | 50% |
| Specific gravity | 1.237 |
| pH, 10% solution | 3.5 |

TABLE 3-continued

| Typical Analysis of Ammonium Lignin Sulfonate | |
|---|---|
| Sugars - expressed as glucose | 16.0% |
| Tannin content | 45.0% |
| Available ammonia | 3.0% |
| Sulfur | 6.0% |
| Ash | 1.0% |

The sugar solution is the energy source ingredient of the supplement. Sources of other metabolizable organic values can be used to replace a portion of the sugar solutions. Examples of such other useful energy ingredients sources include condensed and dehydrated molasses solubles which are obtained from the fermentation of molasses to produce chemicals such as ethanol, citric acid, glutamic acid, etc. A material rich in metabolizable values, known as condensed molasses solubles, is obtained by evaporation of the residue from this fermentation. This material can also be dehydrated to dryness and the resultant dry solid is also a useful additive. Another very useful feed solution is a condensed or concentrated fermented corn extract, which is sometimes referred to as corn steep liquor or mazofern. This material is obtained by concentrating the liquid remaining after steeping corn in an aqueous sulfur dioxide solution and allowing it to ferment. These materials can have from 40 to 100 percent solids and contain, on a dry weight basis, from 1 to 15 percent sugar and contain significant contents of protein, e.g., from 5 to about 25 percent. All, or any portion of the aforementioned sugar solutions can be replaced with these feed solutions, depending on the amount of natural protein which is desired in the final supplement.

THE SULFATE OR PHOSPHATE INGREDIENT

The sulfate or phosphate which is employed as a solidifying component in the feed supplement can be phosphoric or sulfuric acid or any soluble salt thereof with the acids being preferred. Mixtures of the sulfate and phosphate can also be used in proportions of from 10 to 90 percent of either sulfate or phosphate. Examples of useful sulfates or phosphates include the alkali metal and ammonium salts, e.g., sodium sulfate, sodium phosphate, potassium sulfate, potassium phosphate, ammonium sulfate or ammonium phosphate. The preferred ingredient is sulfuric or phosphoric acid which can be of any commercially available grade from 50 to 98 percent acid. When using sulfuric acid the acid preferably is diluted to a concentration range of from 50 to about 75 weight percent to avoid excessive temperature during its addition to the liquid ingredients. The sulfate or phosphate is employed in the sugar solution at a concentration from about 1.0 to about 8.0, preferably from 2.0 to about 5.0 weight percent, expressed as $SO_4$ or $P_2O_5$

THE CALCIUM INGREDIENT

One of the solidifying components of the composition is calcium oxide or hydroxide. Commercially available lime, calcium oxide, is useful in finely subdivided form, typically 90 weight percent or more passing a 125 mesh screen. The more finely subdivided the lime, the faster that it will hydrate and participate in the solidification of the supplement. The lime can be slaked by mixing with water prior to addition to the sugar solution, or if desired, can be added directly to the aqueous sugar solution, depending on the process equipment and controls. The amount of the calcium oxide or hydroxide ingredient which is employed can be from 1.0 to about 8.0 weight percent, expressed as the oxide, and preferably is from about 3.0 to about 5.0 weight percent based on the weight of the sugar solution.

THE MAGNESIUM OXIDE INGREDIENT

The other solidifying solid additive is finely subdivided magnesium oxide in an amount from 2 to about 15 weight percent, preferably from 3 to about 10 weight percent. This quantity of magnesium is also useful for increasing milk production of dairy cattle and for preventing grass tetany and acidosis in cattle. The magnesium oxide should be firmly subdivided, at least 90 weight percent passing a 100 mesh screen, preferably all passing a 325 mesh screen. Preferably the magnesium oxide has an activity of from 5 to about 65 seconds when measured in a standard activity test (citric acid test).

THE PROTEIN SOURCE

The feed supplement can also contain a nitrogen source for the animal's protein requirements. The nitrogen can be in proteins which are commonly found in various sources such as: dried blood and meat meal from rendering plants, cottonseed meal, soy meal, rape seed meal, sunflower seed meal, dehydrated alfalfa, dried and sterilized animal and poultry manure, fish meal, liquid or powdered egg, fish solubles, cell cream and rabbit pellets. When the feed supplement is intended for consumption by ruminants, a non-protein nitrogen compound such as ammoniacal compounds, e.g., urea, biuret or mono- or di- ammonium phosphates can be used to supplement the protein requirements. The preferred non-protein nitrogen source is urea which can be added in an amount from 2 to about 15 weight percent, preferably from 5 to 12 weight percent, based on the supplement. In some applications, it is preferred to use all "natural" protein, and in such instances, a vegetable meal such as cottonseed meal, soy meal, rape seed meal, corn gluten meal, etc. can be used.

The following examples illustrate practice of the invention and will serve to demonstrate results obtainable therewith.

Example 1

Samples of blocks are obtained from a commercial production of feed supplement blocks. The blocks have the following formulation:

TABLE 4

| Ingredient | Percent |
|---|---|
| Cane molasses | 44.0 |
| Water | 6.0 |
| Lime | 2.8 |
| Urea | 4.0 |
| Phosphoric acid | 4.0 |
| Magnesium oxide | 4.5 |
| Corn glutin | 13.0 |
| Salt | 4.5 |
| Corn Steep Liquor | 10.8 |
| Soya oil | 3.0 |
| Bloodmeal | 3.0 |

Samples of the block were poured into small laboratory boxes, approximately 4 by 3 inches by 2 inches in height. Mold spores were added to each block sample and stirred into the liquid before it hardened into blocks. The surfaces of the test blocks were sprayed with an aqueous solution containing an antibiotic mold inhibitor, Delvocid, at 1 and 10 parts per million; and then sprayed with an aqueous solution of ten weight percent polyvinyl alcohol to apply the film former at two concentrations; 200 and 500 milligrams per box.

The blocks were maintained at 110° F. overnight and then were weighed and placed in a high humidity chamber saturated with water vapor and mold spores. The blocks were periodically inspected and the number of days before mold growth became visible on the surface of each block was recorded. At the conclusion of the test, the blocks were again weighed and the gain or loss in weight was recorded.

The results are reported in the following table:

TABLE 5

Blocks With Incorporated Inhibitor and/or Film Former

| Sample | Inoculated | Inhibitor Level | PVA per Surface | % Moisture Loss/Gain | Days for Mold to Appear |
|---|---|---|---|---|---|
| Control | no | 0 | 0 | +5.1 | 32 |
| Inoc Cont | surface | 0 | 0 | +6.3 | 30 |
| Inoc Cont | mixed in | 0 | 0 | +5.5 | 33 |
| Inhibitor | no | 1 ppm | 0 | +4.9 | NA |
| Inhibitor | surface | 1 ppm | 0 | +5.4 | NA |
| Inhibitor | mixed in | 1 ppm | 0 | +5.1 | NA |
| Inhibitor | no | 10 ppm | 0 | +5.9 | NA |
| Inhibitor | surface | 10 ppm | 0 | +6.1 | NA |
| Inhibitor | mixed in | 10 ppm | 0 | +5.3 | NA |
| PVA | no | 0 | 200 mg | 0 | 47 |
| PVA | surface | 0 | 200 mg | −.1 | 36* |
| PVA | mixed in | 0 | 200 mg | −.3 | 41* |
| PVA | no | 0 | 500 mg | +.2 | 47* |
| PVA | surface | 0 | 500 mg | −.1 | 42* |
| PVA | mixed in | 0 | 500 mg | +.3 | 44* |
| Both | no | 1 ppm | 200 mg | −.3 | NA |
| Both | surface | 1 ppm | 200 mg | +.1 | NA |
| Both | mixed in | 1 ppm | 200 mg | −.2 | NA |
| Both | no | 10 ppm | 200 mg | −.2 | NA |
| Both | surface | 10 ppm | 200 mg | +.1 | NA |
| Both | mixed in | 10 ppm | 200 mg | +.4 | NA |
| Both | no | 1 ppm* | 500 mg | +.1 | NA |
| Both | surface | 1 ppm* | 500 mg | −.3 | NA |
| Both | mixed in | 1 ppm* | 500 mg | +.4 | NA |
| Both | no | 10 ppm* | 500 mg | −.2 | NA |
| Both | surface | 10 ppm* | 500 mg | +.1 | NA |
| Both | mixed in | 10 ppm* | 500 mg | +.2 | NA |

*The mold inhibitor was mixed into the PVA coating composition and a single spray application was made of mold inhibitor and PVA.

The experiment demonstrates that the coating of the film former is an effective moisture barrier in that all samples coated with the film former exhibited no significant change in moisture content, whereas the uncoated samples exhibited from 4.9 to 6.3 weight percent weight gain by absorption of moisture in the high humidity chamber. The experiment further demonstrates that the mold inhibitor effectively prevented development of mold on the surfaces of the samples.

Example 2

A block formulation, substantially of the ingredients of Example 1, was prepared in a laboratory mixing vessel. After addition of the last ingredient, the resultant liquid mixture was poured into small cardboard boxes as described in Example 1. Immediately thereafter the surfaces of the liquids in the boxes were coated with the preservative compositions of the invention. The preservative compositions were:

TABLE 6

| Composition | Ingredients |
|---|---|
| A | 10% polyvinylalcohol in water |
| B | 5% polyvinylalcohol + 25% Mold Chek(1) |
| C | 5% polyvinylalcohol + 100 ppm Delvocid* |
| D | 5% polyvinylalcohol + 25% Mold Check + 100 ppm Delvocid |
| E | 100% Wax |
| F | 100% Wax + 100 ppm Delvocid |
| G | 75% Wax + 25% Mold Check + 100 ppm Delvocid |

The coatings were spread across the liquid surfaces of the supplements at dosages of 1 to 2 grams per box (18 square inches). After application of the coatings the boxes were placed in a laboratory oven maintained at 120° F. where they remained overnight. The next morning the boxes were removed, and inoculated with mold spores by spraying an aqueous suspension of the mold spores onto the surfaces of the blocks and the blocks were stored in a chamber maintained at ambient temperatures (70°–80° F.) and at saturated (100%) humidity.

The boxes were periodically inspected for development of mold growths and the days of storage in the humidity chamber until appearance of mold are reported in the following table:

TABLE 7

| Coating | Days for Mold to Appear |
|---|---|
| A | 43 on edges |
| B | no mold observed |
| C | no mold observed |
| D | no mold observed |
| E | 39 at edges |
| F | no mold observed |
| G | no mold observed |
| none | 27 on surface and edges |

Throughout the test, the surfaces of the feed supplement maintained a glossy, brown molasses appearance.

When the experiment is repeated with wax, alone, as the coating, but with the application of a wax coating on the inside surfaces of the cardboard boxes before filling with the feed supplement, no mold growth appears even after lengthy storage in the humidity chamber.

The invention has been illustrated with application to a chemically formed molasses block, using soluble phosphate or sulfate and calcium or calcium and magnesium reactants. It is applicable as well to other poured molasses blocks, including blocks prepared by evaporative concentrations of molasses such as described in the aforementioned U.S. Pat. No. 3,961,081. In this preparation, molasses is heated to a temperature from 200° to 350° F. and evaporated at atmospheric or subatmospheric pressure from 0.1 to 1 atmosphere, absolute pressure, and the aforementioned feed nutrients, including the protein, phosphate, calcium, magnesium, fat, vitamins and minerals can be added to the molasses, and the mixture can be poured into suitable cardboard cartons or metal drums. The preservative coating of the invention can be applied to blocks produced by this method using the same application procedures described herein for the chemical poured blocks, preferably, by the application of the coating directly to the liquid supplement to immediately after its manufacture.

The invention is also applicable to blocks prepared with other solidifying ingredients such as from 2 to 12 weight percent magnesium oxide and/or 2 to 12 weight percent calcium oxide. Clays, in amounts from 0.1 to 5 weight percent can also be used to aid solidification. In some instances, notably when magnesium oxide is the solidifying agent, it is advantageous to heat the supplement ingredients and to store the supplement, after its preparation, at temperatures from 120° to about 165° F., until the ingredients solidify. The preservative coating of this invention can be applied to blocks prepared by these methods using the same application procedures described herein for the chemical poured blocks, preferably, by the application of the coating directly to the liquid supplement to immediately after its manufacture.

The invention has been described with reference to the illustrated and preferred embodiment. It is not intended that the invention be unduly limited by this description of preferred embodiments. Instead, it is intended that the invention be defined by the means, and steps, and their obvious equivalents set forth in the following claims.

I claim:

1. In a method for manufacturing a poured solid animal feed supplement wherein a solidifying aqueous solution of sugar, protein, and mixtures thereof is poured into containers and permitted to solidify into solids having top exposed surfaces therein, the improvement comprising; applying, to the exposed surfaces of said supplement in said containers, an aqueous solution consisting essentially of water soluble polyvinyl alcohol in an amount sufficient to form a film having a thickness from 0.1 to about 10 mils.

2. The method of claim 1 wherein said aqueous solution of polyvinyl alcohol is applied to the surface of said supplement while said supplement is liquid.

3. The method of claim 1 wherein said solidifying aqueous solution contains, as the solidifying ingredients, a calcium reactant selected from the group consisting of calcium hydroxide and calcium oxide in an amount from 1 to about 8.0 weight percent, and a soluble phosphate reactant selected from the group consisting of ammonium and alkali metal phosphates and phosphoric acid in an amount from 3.0 to 8.0 weight percent.

4. The method of claim 3 wherein said solidifying ingredients also include 10 weight percent magnesium oxide.

5. The method of claim 4 wherein said magnesium oxide is finely subdivided with at least 90 weight percent thereof passing a 100 mesh screen.

6. The method of claim 1 wherein said sugar solution is molasses of a concentration from 65 to 85 Brix.

7. The method of claim 1 wherein said method also includes adding from 2 to about 30 weight percent fat.

8. The method of claim 1 wherein said method includes adding a non-protein nitrogen source to said mixture in an amount sufficient to provide from 1 to about 40 weight percent calculated as equivalent protein in said supplement.

* * * * *